(12) United States Patent
Uthaman et al.

(10) Patent No.: US 11,216,382 B1
(45) Date of Patent: Jan. 4, 2022

(54) INTELLIGENT HIERARCHICAL CACHING BASED ON METRICS FOR OBJECTS IN DIFFERENT CACHE LEVELS

(71) Applicant: Amazon Technologies, Inc., Seattle, WA (US)

(72) Inventors: Karthik Uthaman, Seattle, WA (US); Ronil Sudhir Mokashi, Mercer Island, WA (US); Prashant Verma, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/820,414

(22) Filed: Mar. 16, 2020

(51) Int. Cl.
*G06F 12/0897* (2016.01)
*G06F 12/0891* (2016.01)
*G06F 12/128* (2016.01)

(52) U.S. Cl.
CPC ...... *G06F 12/0897* (2013.01); *G06F 12/0891* (2013.01); *G06F 12/128* (2013.01); *G06F 2212/306* (2013.01)

(58) Field of Classification Search
CPC .................................................. G06F 12/0897
USPC .......................................................... 711/122
See application file for complete search history.

(56) References Cited

U.S. PATENT DOCUMENTS

| 8,370,449 B2 | 2/2013 | Harvell et al. |
| 8,863,204 B2 | 10/2014 | Whyte et al. |
| 2009/0144503 A1* | 6/2009 | Faucher .............. G06F 12/0864 711/128 |

* cited by examiner

*Primary Examiner* — Jae U Yu
(74) *Attorney, Agent, or Firm* — Robert C. Kowert; Kowert, Hood, Munyon, Rankin & Goetzel, P.C.

(57) ABSTRACT

A cache system may maintain size and/or request rate metrics for objects in a lower level cache and for objects in a higher level cache. When an L1 cache does not have an object, it requests the object from an L2 cache and sends to the L2 cache aggregate size and request rate metrics for objects in the L1 cache. The L2 cache may obtain a size metric and a request rate metric for the requested object and then determine, based on the aggregate size and request rate metrics for the objects in the L1 cache and the size metric and the request rate metric for the requested object in the L2 cache, an indication of whether or not the L1 cache should cache the requested object. The L2 cache provides the object and the indication to the L1 cache.

20 Claims, 11 Drawing Sheets

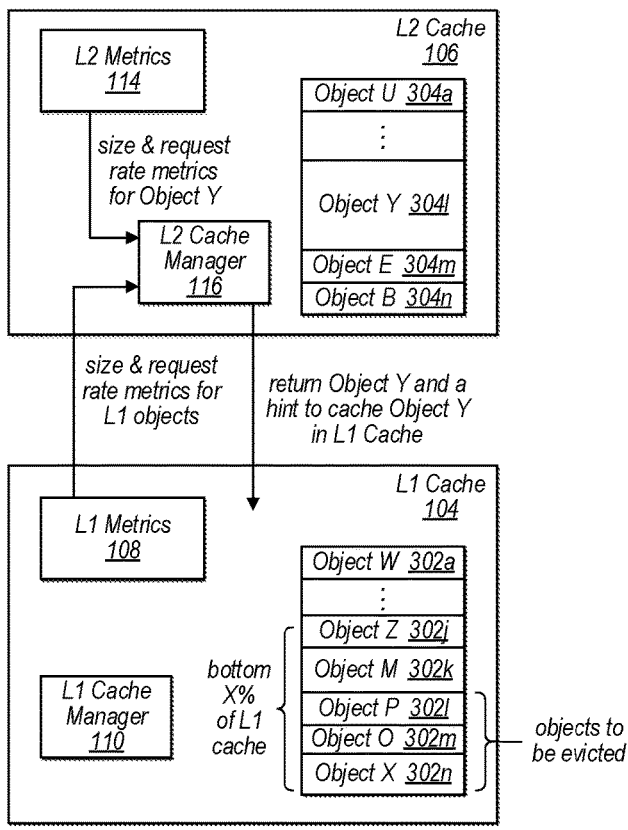
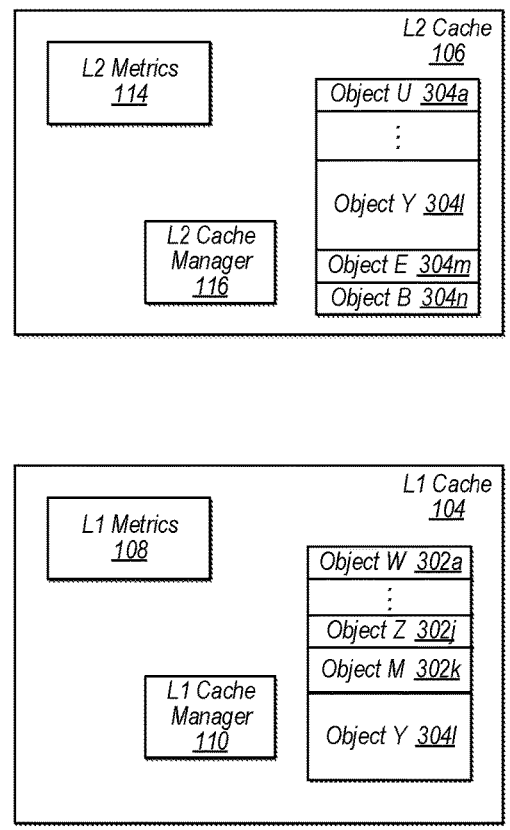
FIG. 3A
FIG. 3B

INTELLIGENT HIERARCHICAL CACHING BASED ON METRICS FOR OBJECTS IN DIFFERENT CACHE LEVELS

BACKGROUND

In order to provide faster responses for requested content, many content delivery providers will cache content in data centers that are closer to the end clients. For example, a content provider may use one or more edge servers along with storage devices such as solid state drives (SSD) and hard disk drives (HDD) to cache content at a data center or other edge location that is closer to clients. Due to the high volume of dynamic content that is cached on storage devices, the lifespan of the storage devices can be relatively short. Replacing disks or other storage devices used for caching increases operational expenses for these data centers. Moreover, network usage may increase across a content provider's network as larger quantities of dynamic content is provided to various clients. As more dynamic content is provided for more clients, the frequency of replacing disks and associated network equipment continues to rise, which ends up increasing the operational burden on content providers.

BRIEF DESCRIPTION OF THE DRAWINGS

FIG. 3A is a logical block diagram illustrating a higher level cache that sends to a lower level cache an indication that the lower level cache should cache a requested object, according to some embodiments.

FIG. 3B is a logical block diagram illustrating contents of a higher level cache and a lower level cache after the lower level cache caches an object provided by a higher level cache, according to some embodiments.

Figure 1:
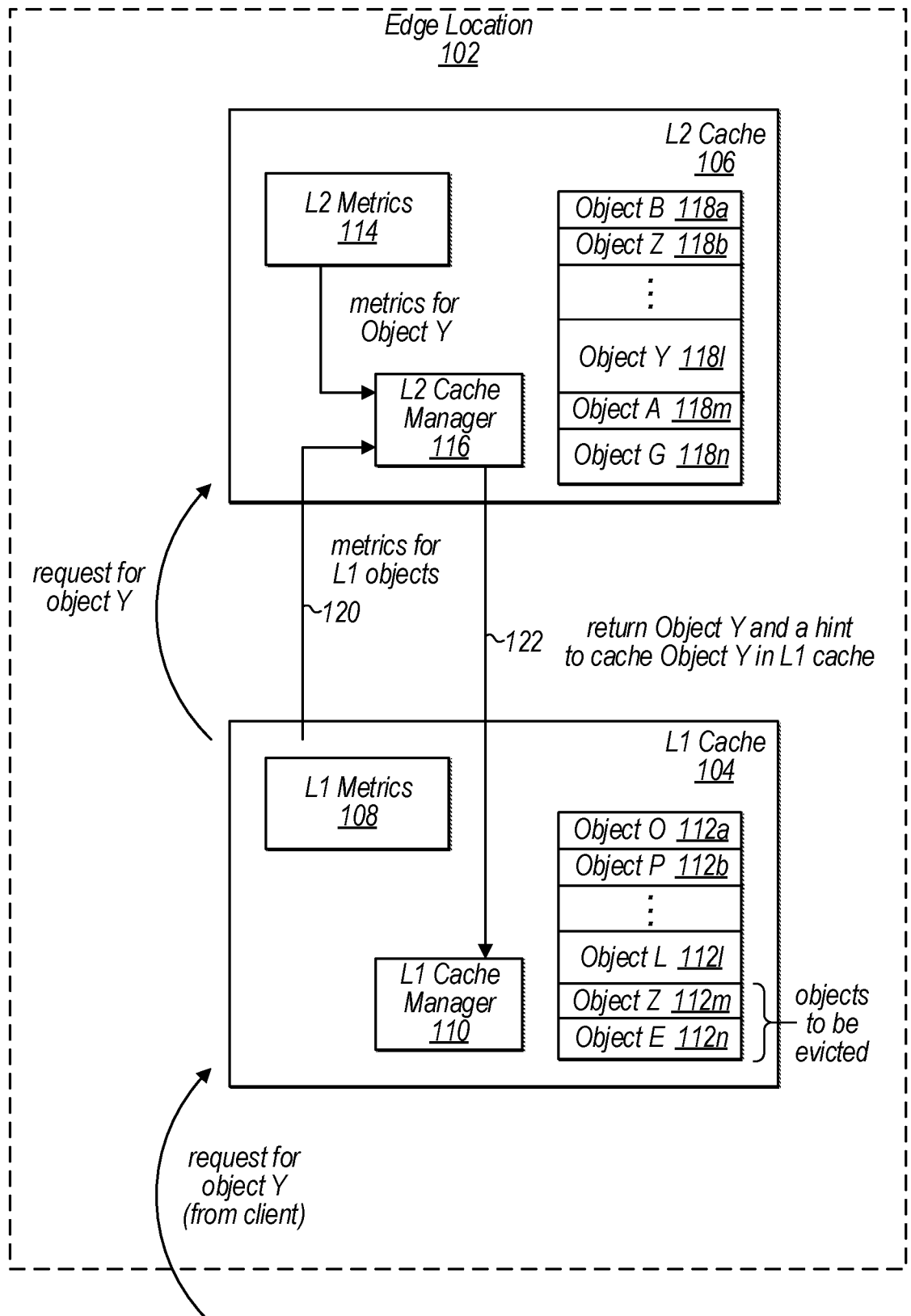
FIG. 1 is a logical block diagram illustrating a system for intelligent hierarchical caching based on metrics for objects in different cache levels, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement intelligent hierarchical caching based on metrics for objects in different cache levels, according to some embodiments. In embodiments, using intelligent hierarchical caching based on metrics for objects in different cache levels may optimize disk and network usage (e.g., of a content delivery network (CDN)) by reducing the amount of writes in a cache system due to requests for data. In various embodiments, a cache system may use one or more size metrics and/or request rate metrics for objects at different cache levels in order to indicate to a lower cache level whether or not the lower level cache should cache a requested object.

In embodiments, a cache system may maintain size and/or request rate metrics for objects in a lower level cache and for objects in a higher level cache. In some embodiments, in response to receiving a request for an object, the lower level cache may determine whether the object is present in the lower level cache. If not, then the lower level cache may request the object from the higher level cache and send to the higher level cache the aggregate size and request rate metrics for objects in the lower level cache. The higher level cache may obtain a size metric and a request rate metric for the requested object and then determine, based on the aggregate size and request rate metrics for the objects in the lower level cache and the size metric and the request rate metric for the requested object in the higher level cache, an indication of whether or not the lower level cache should cache the requested object. The higher level cache may then send the object to the lower level cache, as well as the indication of whether or not the lower level should cache the requested object.

In embodiments, after receiving an indication that the lower level should cache the requested object, the lower level cache may determine, based on the indication and/or based on one or more other factors, whether to cache the requested object in the lower level cache. If the lower level cache determines to cache the requested object, then the lower level cache may evict one or more objects to free a sufficient amount of space to store the requested object. The lower level cache may then cache the object. In embodiments, the lower level cache may also update metrics based on the newly-added object.

Embodiments reduce the amount of network traffic between different cache levels/layers and reduce the number of writes to lower level caches when responding to client requests for objects. When a higher level cache receives a request for an object, the higher level cache may analyze usage metrics of the lower level cache and usage metrics of the higher level cache to determine whether to recommend caching the requested object in the lower level cache. As described herein, by intelligently deciding whether or not to store a client-requested object into a lower level cache, the number of writes to cache storage devices (e.g., SSDs, HDDs) is reduced and network usage is reduced, which extends the life of storage devices and network equipment (reducing a CDN's operation costs).

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 11 and described below.

This specification begins with a description of using intelligent hierarchical caching based on metrics for objects in two different cache levels. A number of different methods and techniques to implement intelligent hierarchical caching based on metrics for objects in different cache levels are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for intelligent hierarchical caching based on metrics for objects in different cache levels, according to some embodiments.

In the depicted embodiment, an edge location 102 of a content delivery network may include a lower level cache (e.g., L1 cache 104) and a higher level cache (e.g., L2 cache 106). In embodiments, the edge location 102 may be a data center of the content delivery network and another remote data center of the content delivery network may include one or more origin servers that provide data for the L2 cache and/or L1 cache. In some embodiments, the L1 cache 104 and the L2 cache 106 may be located in different computing systems (e.g., different servers) within the same local data center/network. In some embodiments, the two caches may be in the same computing system. As described herein, in some embodiments the L1 cache 104 may be remotely located from the L2 cache 106 (e.g., in different data centers/local networks) and they may communicate via a wide-area network (e.g., the Internet).

As shown, the L1 cache 104 includes L1 metrics 108, L1 cache manager 110, and any number of cached objects 112a-112n. Similarly, the L2 cache 106 includes L2 metrics 114, L1 cache manager 116, and any number of cached objects 118a-118n. The L1 metrics 108 (and likewise the L2 metrics 114) may include one or more cache metrics (e.g., size of the object ("size metric"), request rate for the object ("request rate metric"), resource utilization due to requests for the object ("resource utilization metric")) for any number (or all) of objects in the L1 cache (and likewise the L2 cache). In various embodiments, a request rate metric may represent a rate of requests that a given object receives (e.g., 2 requests per second or 2 RPS). In some embodiments, a request rate metric may be a metric that is based on the rate of requests that a given object receives (e.g., a data rate of 100 bytes per second (BPS) may be a request rate metric for a given object that is based on the rate of requests (e.g., RPS) for the object).

In embodiments, the L1 metrics may include individual and/or aggregate size and request rate metrics for any number of the objects in the L1 cache, such as average size of the objects (e.g., in bytes or any other suitable unit of size), average number of requests per object (while the object is in the L1 cache), average life of the objects in the L1 cache (e.g., in seconds or any other unit of time), average request rate of the objects (e.g., in seconds or any other unit of time), etc. Similarly, the L2 metrics may include individual and/or aggregate size and request rate metrics for any number of the objects in the L2 cache, such as average size of the objects (e.g., in bytes or any other suitable unit of size), average number of requests per object (while the object is in the L2 cache), average life of the objects in the L2 cache (e.g., in seconds or any other unit of time), average request rate of the objects (e.g., in seconds or any other unit of time), etc.

In the depicted embodiment, the L1 cache receives a request from a client for object Y 1181. In embodiments, the request may be from a remote client (e.g., via the Internet) or the request may be from a local client (e.g., within the edge location/local network). As shown, object Y is not present in the L1 cache. The cache manager 110 may determine that object Y is not present in the L1 cache and in response, request object Y from the L2 cache and also send, to the L2 the cache, the size and request rate metrics 120 for at least a portion of the objects in the L1 cache (e.g., any number of the objects). For example, the L1 cache may send to the L2 cache an average size and an average request rate for the objects in the L1 cache.

The L2 cache manager may receive the request for object Y and in response, obtain (e.g., from the L2 metrics) a size metric and a request rate metric for object Y. In embodiments, the L1 metrics and the L2 metrics are kept up to date (e.g., updated on a scheduled and/or periodic basis) based on the usage of the L1 and/or L2 cache objects (e.g., request rates, etc.).

In embodiments, the L2 cache manager may determine, based on the received size and request rate metrics 120 for the objects in the L1 cache and the obtained size metric and the request rate metric for object Y, an indication of whether or not the L1 cache should cache object Y. Examples of how the L2 cache determines whether or not the L1 cache should cache a given requested object are discussed below. In the depicted embodiment the L2 cache sends the requested object to L1, along with an indication 122 (e.g., a "hint") that the L1 cache should cache object Y.

As shown, the L1 cache manager may determine, based on the received indication 122 and/or one or more other factors, that objects Z and E are to be evicted to free a sufficient amount of space to store object Y into the L1 cache. As described herein, the L1 cache may then evict objects Z and E and cache object Y.

Figure 2:
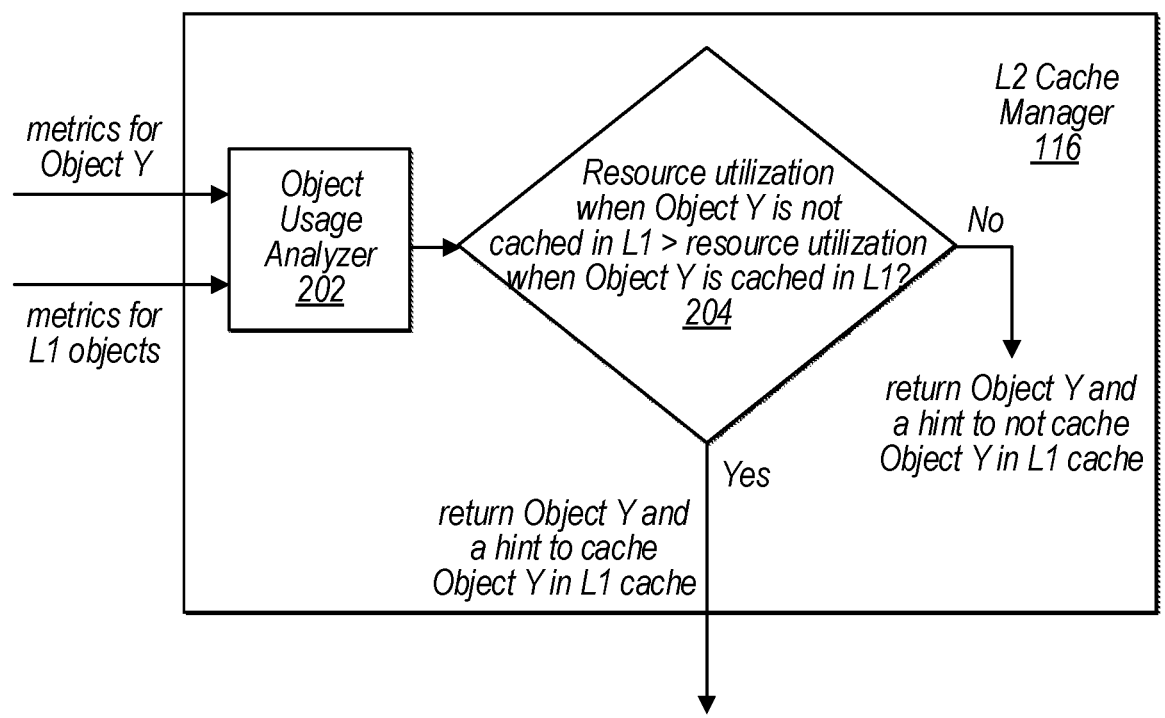
FIG. 2 is a logical block diagram illustrating a cache that determines, based on metrics for different cache levels, an indication of whether or not a lower level cache should cache a requested object, according to some embodiments.

FIG. 2 is a logical block diagram illustrating a cache that determines, based on metrics for different cache levels, an indication of whether or not a lower level cache should cache a requested object, according to some embodiments.

In the example embodiment, the L2 cache manager 116 includes an object usage analyzer 202. The object usage analyzer determines, based on the received size and request rate metrics 120 for the objects in the L1 cache and the obtained size metric and the request rate metric for object Y, an indication of whether or not the L1 cache should cache object Y.

As shown, the determination may be based on the metrics and a comparison 204. For example, the object usage analyzer may determine, based on the metrics for object Y and the metrics for at least a portion of the objects in the L1 cache, an expected resource utilization when object Y is not cached in the L1 cache (e.g., object Y remains in the L2 cache) and a different expected resource utilization when object Y is cached in the L1 cache (note that object Y may continue to be stored/cached in the L2 cache even though it is cached in the L1 cache). In embodiments, "resource utilization" may be a measurement and/or value that indicates an amount of usage of one or more resources of the content delivery network (e.g., storage devices such as HDDs, SDDs, network traffic routing equipment, etc.). In such embodiments, if the expected resource utilization when object Y is not cached in the L1 cache is greater than the expected resource utilization when object Y is cached in the L1 cache, then the L2 cache manager returns object Y along with an indication to cache object Y in the L1 cache (e.g., to reduce the resource utilization of the one or more resources of the content delivery network). If the expected resource utilization when object Y is not cached in the L1 cache is less than the expected resource utilization when object Y is cached in the L1 cache, then the L2 cache manager returns object Y along with an indication to not cache object Y in the L1 cache (e.g., to prevent the resource utilization of the one or more resources of the content delivery network from rising).

In embodiments, resource utilization may be a data rate (e.g., BPS or other measurement of traffic volume/bandwidth) that is used to service requests for content from one or more clients (e.g., request for one or more objects stored at one or more different cache levels). In various embodiments, resource utilization may be a number of writes or a rate of writes (e.g., over a period of time) that is performed to a cache level (e.g., L1 cache) to service requests for content from one or more clients (e.g., request for one or more objects stored at one or more different cache levels). In embodiments, the higher an resource utilization is for a given resource, the lower the lifetime is for the given resource (the amount of time the given resource can operate before it fails and must be replaced). By reducing resource utilization, various embodiments reduce the frequency of replacing resources, thereby reducing the downtime of a CDN, improving quality of service for clients, and reducing operation costs of the CDN.

One example embodiment of determining expected resource utilization is described below. In the example embodiment, the bytes per second (BPS) for object Y may be calculated by multiplying the request rate (requests per second) for object Y ("Object Y RPS") by the size (e.g., bytes) of object Y ("Object Y size"). To calculate the expected BPS for objects to be evicted from L1, the analyzer 202 may first calculate the number of objects to be evicted from the L1 cache by dividing the size of object Y by the average size of the objects in the L1 cache, and then rounding up to the nearest integer. This provides the number the objects in the L1 cache that would, if evicted, free a sufficient amount of space to store object Y in the L1 cache.

Next, the analyzer may divide the average number of requests per object for the objects in the L1 cache (average number of requests for an object while the object is in the L1 cache) by the average life of objects in the L1 cache (e.g., before eviction), which results in an average number of requests per second for the objects in the L1 cache. To arrive at the expected BPS for objects to be evicted from the L1 cache, this result is multiplied by the number of objects to be evicted from the L1 cache (determined above), which is then multiplied by the average size of the objects in the L1 cache (e.g., in bytes).

In the example embodiment, the analyzer may compare 204 the BPS for object Y to the expected BPS for objects to be evicted from the L1 cache. If the BPS for object Y is greater than the expected BPS for objects to be evicted from the L1 cache, then the analyzer 202 returns object Y along with an indication (e.g., "hint") to cache object Y in the L1 cache. If the L1 cache decides to cache object Y based on the hint, then the overall amount of data provided by the L2 cache to the L1 cache due to cache misses may be reduced because object Y (which has the higher BPS than the evicted objects) is now cached in the L1 cache. This may reduce the amount of network traffic due to sending data from the L2 cache to the L1 cache (e.g., reducing the resource utilization of the content delivery network).

In the depicted embodiment, if the BPS for object Y is not greater than the expected BPS for objects to be evicted from the L1 cache, then the analyzer 202 returns object Y along with an indication (e.g., "hint") to not cache object Y in the L1 cache. If the L1 cache decides not to cache object Y based on the hint, then the number of writes to the L1 cache due to cache misses may be reduced because object Y (which has the same or lower BPS than the evicted objects) is not written to the L1 cache. This may reduce the amount of writes made to the L1 cache due to cache misses, compared to traditional techniques (reducing resource utilization). For example, traditional techniques may move object Y to the L1 cache after a particular number of misses (e.g., after the first miss, second miss, etc.) without taking into consideration the change in resource utilization (e.g., the expected BPS for objects). Therefore, embodiments described herein for intelligent caching may reduce the amount of writes to caches in the SDDs, HDDs, and/or other storage devices, which may in turn increase the operational life of the SDDs, HDDs, and/or other storage devices (and may reduce network downtime/costs associated with replacing equipment).

Although bytes per second are used for the data rate in the example embodiment above, any other units suitable for measuring a data rate may be used. In other words, any units may be used that are suitable for comparing the data rate for object Y (e.g., amount of data served due to requests for object Y) to the data rate for the number of objects to be evicted from the L1 cache (e.g., amount of data served due to requests for object Y). In embodiments, the data rates may be based on request rate measurements for one or more objects over a predetermined amount of time (e.g., an amount of requests made during a most recent 1 second window, a most recent 10 second window, etc.).

In some embodiments, the analyzer 202 may determine which objects in the L1 cache should be evicted based on individual size metrics for each of the objects in the L1 cache. Therefore, instead of relying on an average size of the objects, the analyzer may be able to determine the exact objects that need to be evicted from the L1 cache in order to free a sufficient amount of space to store object Y in the L1 cache.

FIG. 3A is a logical block diagram illustrating a higher level cache that sends to a lower level cache an indication that the lower level cache should cache a requested object, according to some embodiments.

In the example embodiment, the L1 cache includes objects 302a-302n and the L2 cache includes the objects 304a-304n. In response to receiving a request for object Y from the L1 cache (e.g., due to a cache miss for object Y at the L1 cache), the L2 cache determines, based on received size and request rate metrics for a portion (or all) of the objects in the L1 cache (e.g., the least recently used 20% of the L1 cache objects or "bottom 20%") and the obtained size metric and the request rate metric for object Y, an indication to cache object Y in the L1 cache. In some embodiments, any least recently used percentage of the objects may be used, depending on any number of factors. For example, a larger percentage (e.g., bottom 30%) may be used if the size of object Y is larger. In some embodiments, a size may be specified instead, such as the least recently used bottom 20 gigabytes (GB) of objects in the L1 cache. In some embodiments, any portion/subset of the cache may be used, depending on any number of factors. For example, metrics for objects in a larger portion of the cache (e.g., bottom 30 GB) may be used as the size of object Y increases.

By analyzing only a portion of the objects of the L1 cache (e.g., objects in the bottom 10% or objects that take up the bottom 10 GB of the cache), the analysis may be optimized by reducing the time for the L2 cache manager to analyze the metrics and arrive at a decision of whether or not the requested object should be cached. However, in some embodiments, the metrics for all of the objects in the L1 cache are obtained and analyzed in order to arrive at a decision of whether or not the requested object should be cached.

Note that although the bottom 20% are shown adjacent to each other in FIG. 3A, the objects are not necessarily stored in physically adjacent portions of storage memory. Instead, the objects are shown adjacent to indicate that they all belong to the least recently used 20% of objects in the L1 cache. In embodiments, any other percentage may be used. Moreover, in some embodiments, a size may be used instead of a percentage. For example, in embodiments, size and request rate metrics for the least recently used 100 MB of L1 cache objects may be provided to the L2 cache for analysis. In other words, if the L1 cache includes 1000 MB of objects, then size and request rate metrics for the least recently used 100 MB of objects are sent to the L2 cache for analysis.

Note that in various embodiments, any other suitable formula or technique may be used to select/send size and request rate metrics for a subset of the objects in the L1 cache (e.g., a smaller number of the object than the total number of objects in the L1 cache). In embodiments, by selecting/replacing the least recently used objects of the L1 cache as described above, fewer cache misses may result than if the L1 cache objects are selected/replaced using other techniques (e.g., selected at random, etc.).

As shown, the L2 cache determines that the three least recently used objects are to be evicted (objects P, O, and X) from the L1 cache in order to free a sufficient amount of space to store object Y in the L1 cache. Thus, in embodiments, the L1 cache may perform the same or a similar calculation as shown above for the L2 cache in order to determine the number of objects needed to be evicted to free up sufficient space and/or to identify the object to be evicted. In some embodiments, the L2 cache may provide to the L1 cache the number of objects to be evicted and/or identify the actual objects to be evicted.

FIG. 3B is a logical block diagram illustrating contents of a higher level cache and a lower level cache after the lower level cache caches an object provided by a higher level cache, according to some embodiments.

As depicted, the objects P, O, and X have been evicted from the L1 cache, which freed a sufficient amount of space to store object Y in the L1 cache. The L1 cache then cached object Y in the freed up space (or at least a portion of the freed up space). In embodiments, the L2 cache may store all of the objects that are in the L1 cache. Therefore, even though objects P, O, and X have been evicted from the L1 cache, they may still be retrieved from the L2 cache when a client subsequently requests those objects.

Figure 4:
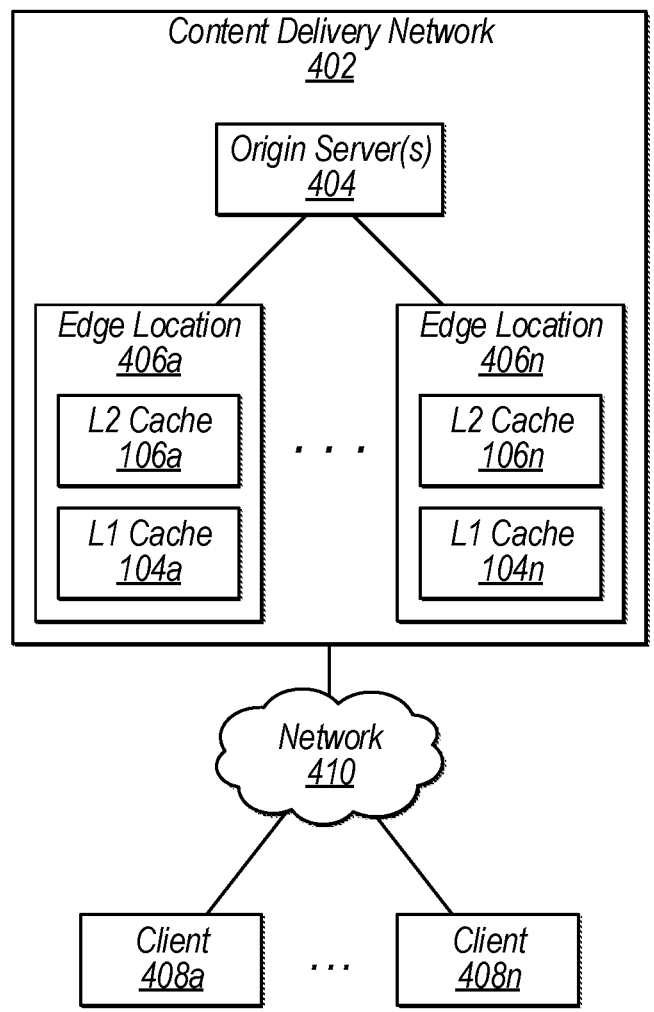
FIG. 4 is a logical block diagram illustrating different edge locations of a content delivery network that each include a higher level cache and a lower level cache, according to some embodiments.

FIG. 4 is a logical block diagram illustrating different edge locations of a content delivery network that each include a higher level cache and a lower level cache, according to some embodiments.

In the example embodiment, a content delivery network 402 includes one or more origin servers 404 in one or more data centers and different remote edge locations 406a-406n (e.g., remote data centers/remote networks with edge servers). Each edge location includes an L1 cache 104 and an L2 cache 106. In embodiments, the content in each L2 cache is based on (e.g., provided by) content stored at the origin servers.

As shown, any number of clients 408 may send requests for content (e.g., objects) over a wide area network (e.g., the Internet 410) to any number of respective edge locations. Each edge location may receive requests from a different group of any number of clients and route the requests to the L1 cache at the edge location. For example, requests from 10 clients may be routed to edge location 406a, while requests from 100 other clients may be routed to edge location 406n.

In embodiments, the contents/objects in each L1 cache and/or L2 cache may be different at each edge location, due to different request rates for the same objects from different clients. Therefore, the objects present in any given L1 cache and/or L2 cache may be different (e.g., one L1 cache may have 100 objects while another L1 cache at another edge location may have 46 objects, where none of the objects in the caches may the same or one or more of the objects in the caches may be the same—e.g., object X may exist in the L1 caches at edge location 406a and edge location 406n, but not in the L1 cache at edge location 406b). Due to different request rates, this may occur even if some or all of the edge locations are initially loaded with the same objects or with no objects in the L1 cache and/or in the L2 cache.

Figure 5:
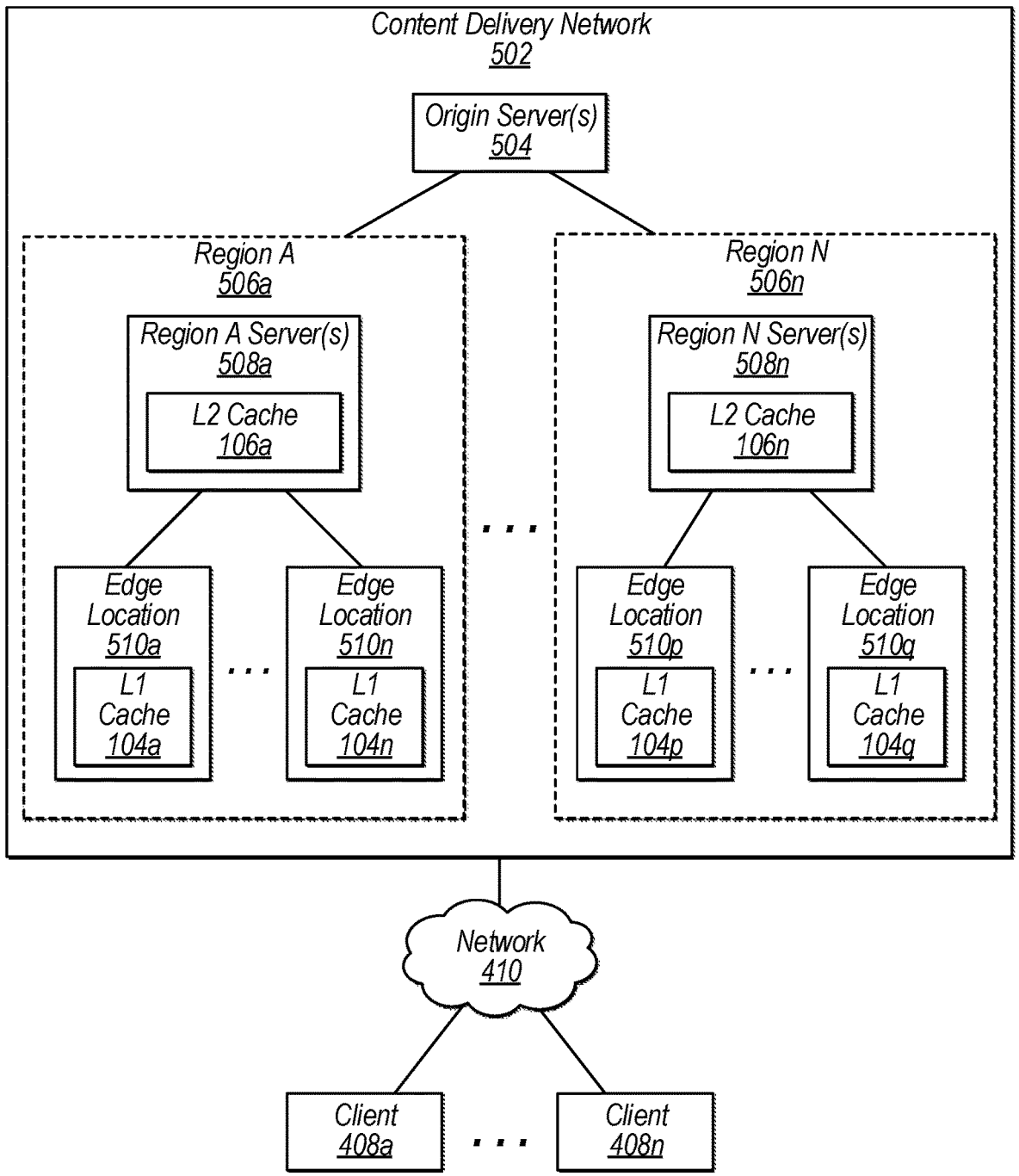
FIG. 5 is a logical block diagram illustrating different regions of a content delivery network that each include regional servers with a higher level cache and edge locations that each include a lower level cache, according to some embodiments.

FIG. 5 is a logical block diagram illustrating different regions of a content delivery network that each include regional servers with a higher level cache and edge locations that each include a lower level cache, according to some embodiments.

In the example embodiment, a content delivery network 502 includes one or more origin servers 504 in one or more data centers as well as different regions 506 that each include one or more region servers 508 that each include an L2 cache 106. As depicted, each of the region server(s) communicates with different remote edge locations 510a-510n in the same region (e.g., remote data centers/remote networks with edge servers). Each edge location includes an L1 cache 104. In embodiments, the content in each L2 cache is based on (e.g., provided by) content stored at the origin servers 504.

In embodiments, a region may be defined by a geographical area or other suitable grouping characteristic. For example, the region A server(s) 508a and/or the edge locations 510 may be located in the same geographical area (e.g., city, state, country, or other defined location).

As shown, any number of clients 408 may send requests for content (e.g., objects) over a wide area network (e.g., the Internet 410) to any number of respective edge locations. Each edge location may receive requests from a different group of any number of clients and route the requests to the L1 cache at the edge location. For example, requests from 10 clients may be routed to edge location 510a, while requests from 100 other clients may be routed to edge location 510n.

As described for FIG. 4, the contents/objects in each L1 cache and/or L2 cache may be different at each edge location and/or each region, due to different request rates for the same objects from different clients. Therefore, the objects present in any given L1 cache and/or L2 cache may be different (e.g., one L1 cache may have 100 objects while another L1 cache at another edge location may have 46 objects, where none of the objects in the caches may the same or one or more of the objects in the caches may be the same—e.g., object X may exist in the L1 caches at edge location 406a and edge location 406n, but not in the L1 cache at edge location 406b).

In the example embodiment, a given regional L2 cache may keep track of size and/or request rate metrics for each of its L1 caches separately. For example, the L2 cache 106a may keep track of request rate metrics for object X for the L1 cache 104a at edge location 510a and keep track of a separate set of request rate metrics for object X for the L1 cache 104n at edge location 510n. In embodiments, this will allow the L2 cache 106a to provide different caching hints with respect to object X, depending on different request rate metrics for the object and other objects in the different L1 caches. For example, if the request rate for object X from the L1 cache 104a is much higher than the request rate for object X from the L1 cache 104n, then the L2 cache may send a hint to cache object X in the L1 cache 104a but may send a hint to not cache object X in the L1 cache 104n (assuming the request rates for other objects in each of the L1 caches are not substantially different).

Figure 6:
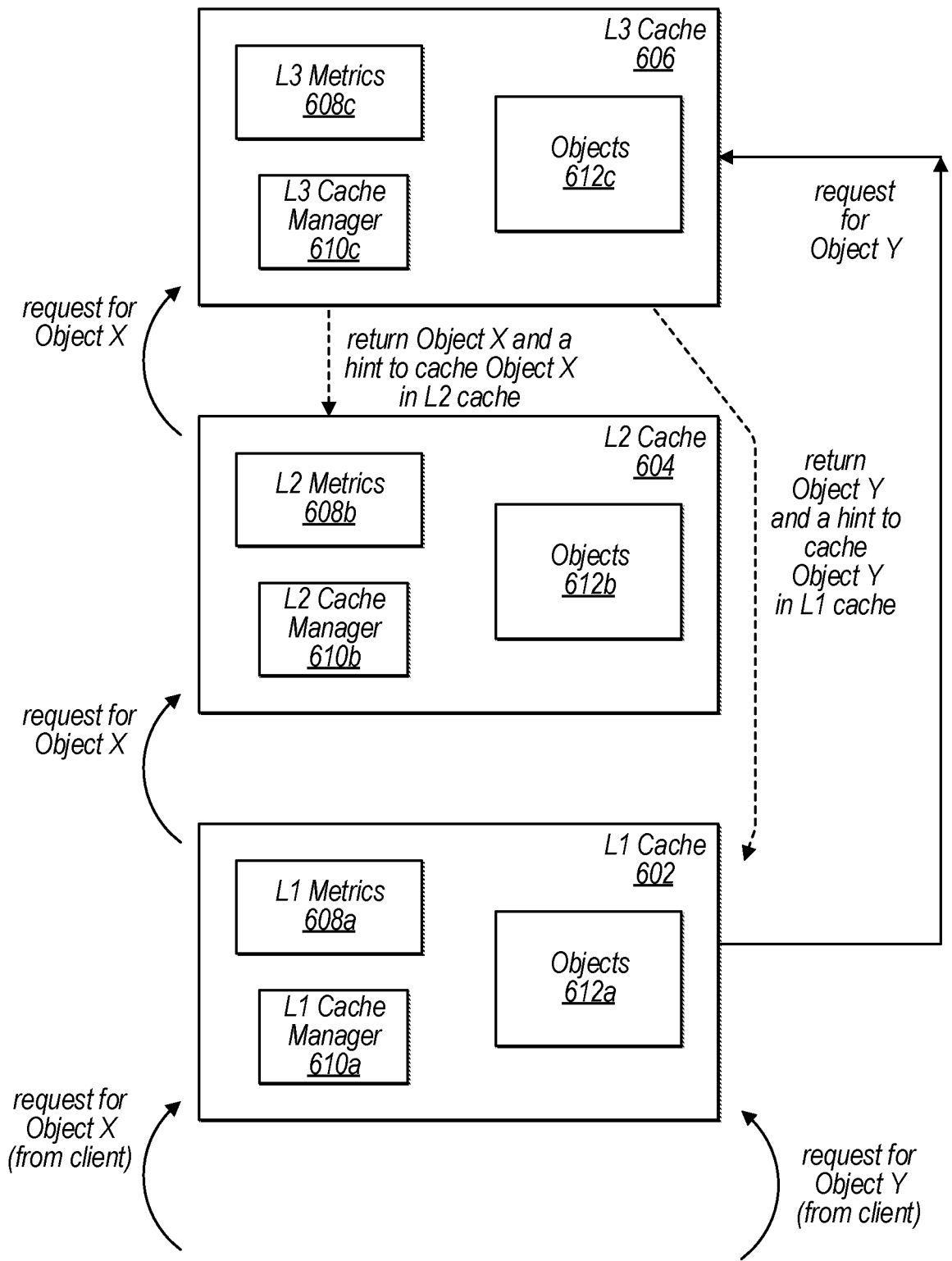
FIG. 6 is a logical block diagram illustrating a system for intelligent hierarchical caching based on metrics for objects in three cache levels, according to some embodiments.

FIG. 6 is a logical block diagram illustrating a system for intelligent hierarchical caching based on metrics for objects in three cache levels, according to some embodiments.

In the depicted embodiment, a content delivery network includes a lower level cache (L1 cache 602), a mid-level cache (L2 cache 604), and a higher level cache (L3 cache 606). Each cache includes metrics 608, a cache manager 610, and objects 612. A request from a client for object X results in a cache miss at the L1 cache (e.g., object X is not in the L1 cache). In the depicted embodiment, the L1 cache then requests object X from the L2 cache and also sends size and request rate metrics for at least a portion of the objects in the L1 cache.

In the example embodiment, the request for object X from the L2 cache results in a cache miss at the L2 cache (e.g., object X is not in the L2 cache). In the depicted embodiment, in response to receiving an indication of the cache miss and/or one or more other factors, the L2 cache requests object X from the L3 cache and also sends size and request rate metrics for at least a portion of the objects in the L2 cache. In some embodiments, the other factors may include a request rate for object X at the L2 cache exceeds a threshold request rate and/or a number of requests for object X at the L2 cache exceeds a threshold number. In some embodiments, if none of the other factors are present, then the L1 cache may instead send the request to an origin server to retrieve the requested object and return the object to the client.

The L3 cache manager determines, based on the received size and request rate metrics for at least a portion of the objects in the L2 cache and an obtained size metric and request rate metric for object X in the L3 cache, an indication that the L2 cache should cache object X. The L3 cache manager then sends object X and the indication to cache object X to the L2 cache.

Also shown is a request from a client for object Y that results in a cache miss at the L1 cache (e.g., object Y is not in the L1 cache). In the depicted embodiment, in response to receiving the indication of the cache miss and one or more other factors, the L1 cache requests object Y from the L3 cache and also sends size and request rate metrics for at least a portion of the objects in the L1 cache. In embodiments, the other factors may include a request rate for object Y at the L1 cache exceeds a threshold request rate and/or a number of requests for object Y at the L1 cache exceeds a threshold number. In embodiments, the L1 cache requests object Y from the L3 cache instead of the L2 cache in response to determining that object Y is not in the L2 cache or unlikely to be in the L2 cache based on a request rate for object Y and/or number of requests for object Y (e.g., if the request rate for object Y and/or number of requests for object Y is below a threshold value). In some embodiments, the L1 cache may instead send the request to an origin server to retrieve the requested object and return the object to the client (e.g., in response to determining that object Y is not in the L3 cache or is unlikely to be in the L3 cache).

The L3 cache manager determines, based on the received size and request rate metrics for at least a portion of the objects in the L1 cache and an obtained size metric and request rate metric for object Y in the L3 cache, an indication that the L1 cache should cache object Y. The L3 cache manager then sends object Y and the indication to cache object Y to the L1 cache. Although three cache levels are depicted, in embodiments any number of cache levels may exist in a hierarchy of cache levels, and any of the cache levels of the hierarchy may communicate with any other cache level in the same or similar way as described in the depicted embodiment.

Figure 7:
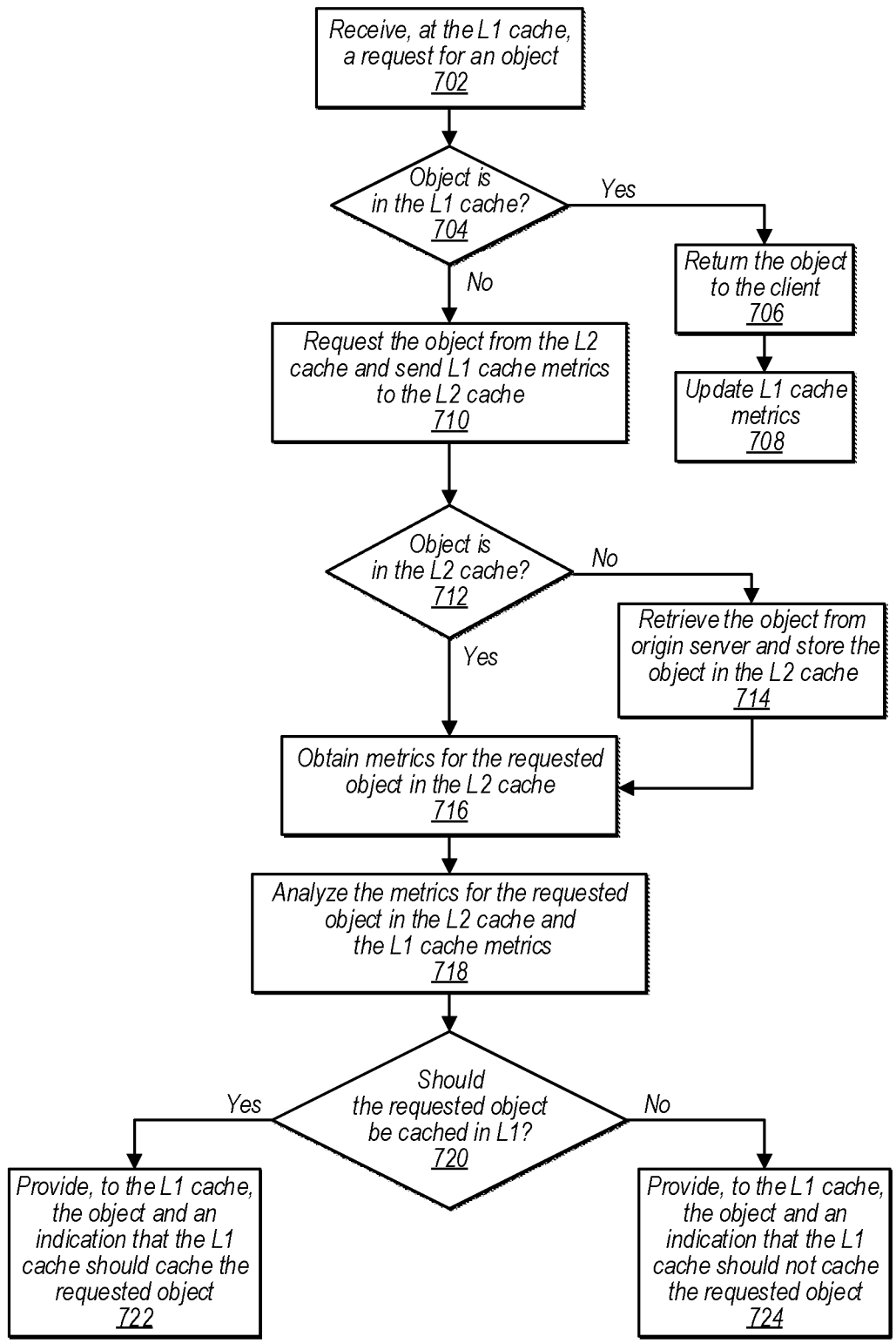
FIG. 7 is a high-level flowchart illustrating various methods and techniques to implement a system for intelligent hierarchical caching based on metrics for objects in a lower level cache and a higher level cache, according to some embodiments.

FIG. 7 is a high-level flowchart illustrating various methods and techniques to implement a system for intelligent hierarchical caching based on metrics for objects in a lower level cache and a higher level cache, according to some embodiments. These techniques, as well as the techniques discussed with regard to FIGS. 8-10, may be implemented using components or systems as described above with regard to FIGS. 1-6, as well as other types of components or systems, and thus the following discussion is not intended to be limiting as to the other types of systems that may implement the described techniques.

As indicated at block 702, an L1 cache may receive a request for an object. At block 704, the L1 cache determines whether the object is in its cache. If so, then at block 706, the L1 cache returns the object to the client and at block 708, the L1 cache updates the L1 cache metrics.

Returning to block 704, if the L1 cache determines that the object is not in its cache, then at block 710, the L1 cache requests the object from the L2 cache and sends L1 cache metrics to the L2 cache. At block 712, the L2 cache determines whether the object is in its cache. If not, then at block 714, the L2 cache retrieves the object from an origin server (or a higher-level cache) and stores the object in the L2 cache. In some embodiments, the object remains stored in the origin server or the higher-level cache for the benefit of other L2 and/or L1 caches that may need to subsequently retrieve it. The process then proceeds to block 716, where the L2 cache obtains metrics for the requested object in the L2 cache.

Returning to block 712, if the L2 cache determines that the object is in its cache, then at block 716, the L2 cache obtains metrics for the requested object in the L2 cache. At block 718, the L2 cache analyzes the metrics for the requested object in the L2 cache and the L1 cache metrics. At block 720, the L2 cache determines whether the requested object should be cached in the L1 cache. If so, then at block 722, the L2 cache provides, to the L1 cache, the requested object and an indication ("hint") that the L1 cache should cache the requested object. If so, then at block 722, the L2 cache provides, to the L1 cache, the requested object and an indication ("hint") that the L1 cache should cache the requested object. If not, then at block 724, the L2 cache provides, to the L1 cache, the requested object and an indication ("hint") that the L1 cache should not cache the requested object.

Figure 8:
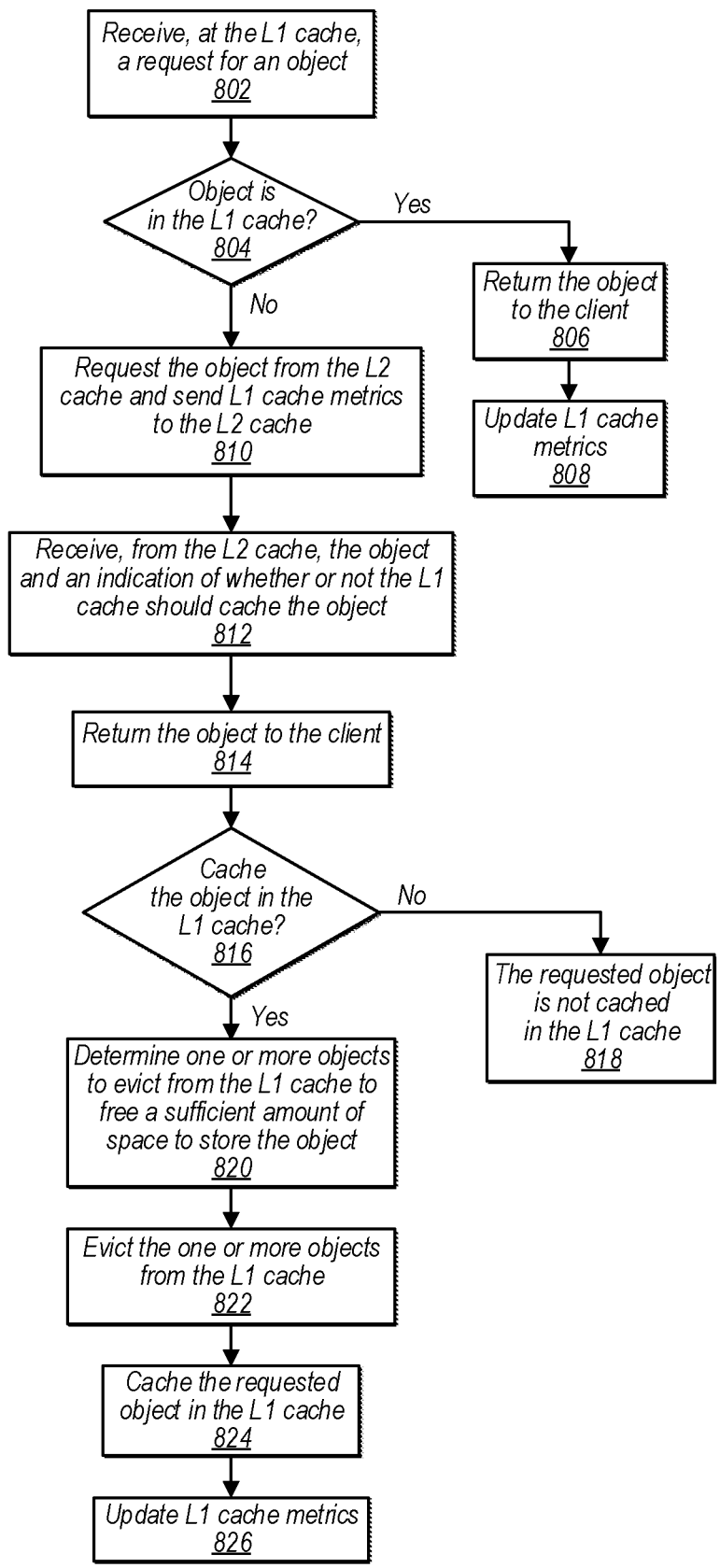
FIG. 8 is a high-level flowchart illustrating various methods and techniques to implement a system for intelligent hierarchical caching based on metrics for objects in a lower level cache and a higher level cache, according to some embodiments.

FIG. 8 is a high-level flowchart illustrating various methods and techniques to implement a system for intelligent hierarchical caching based on metrics for objects in a lower level cache and a higher level cache, according to some embodiments.

At block 802, an L1 cache receives a request for an object. At block 804, the L1 cache determines whether the object is in its cache. If so, then at block 806, the L1 cache returns the object to the client and at block 808, the L1 cache updates the L1 cache metrics.

Returning to block 804, if the L1 cache determines that the object is not in its cache, then at block 810, the L1 cache requests the object from the L2 cache and sends L1 cache metrics to the L2 cache. At block 812, the L1 cache receives, from the L2 cache, the object and an indication of whether or not the L1 cache should cache the object.

At block 814, the L1 cache returns the object to the requesting client. At block 816, the L1 cache determines, based on the indication and/or one or more other factors, whether to cache the object in the L1 cache. For example, the L1 cache may also take into account one or more results of read and write operations per second (IOPS) monitoring and/or a rate or number of previous cache evictions. Based on one or more of the above factors, the L1 cache may decide whether to cache the object.

If the L1 cache determines not to cache the object, then at block 818, the object is not cached in the L1 cache. If the L1 cache determines to cache the object, then at block 820, the L1 cache determines one or more objects to evict from the L1 cache to free a sufficient amount of space to store the requested object.

At block 822, the L1 cache evicts the determined one or more objects from the cache. At block 824, the L1 cache caches the requested object and at block 826, the L1 cache updates the L1 cache metrics based on the requested object (e.g., update size and/or request rate metrics for the objects).

Figure 9:
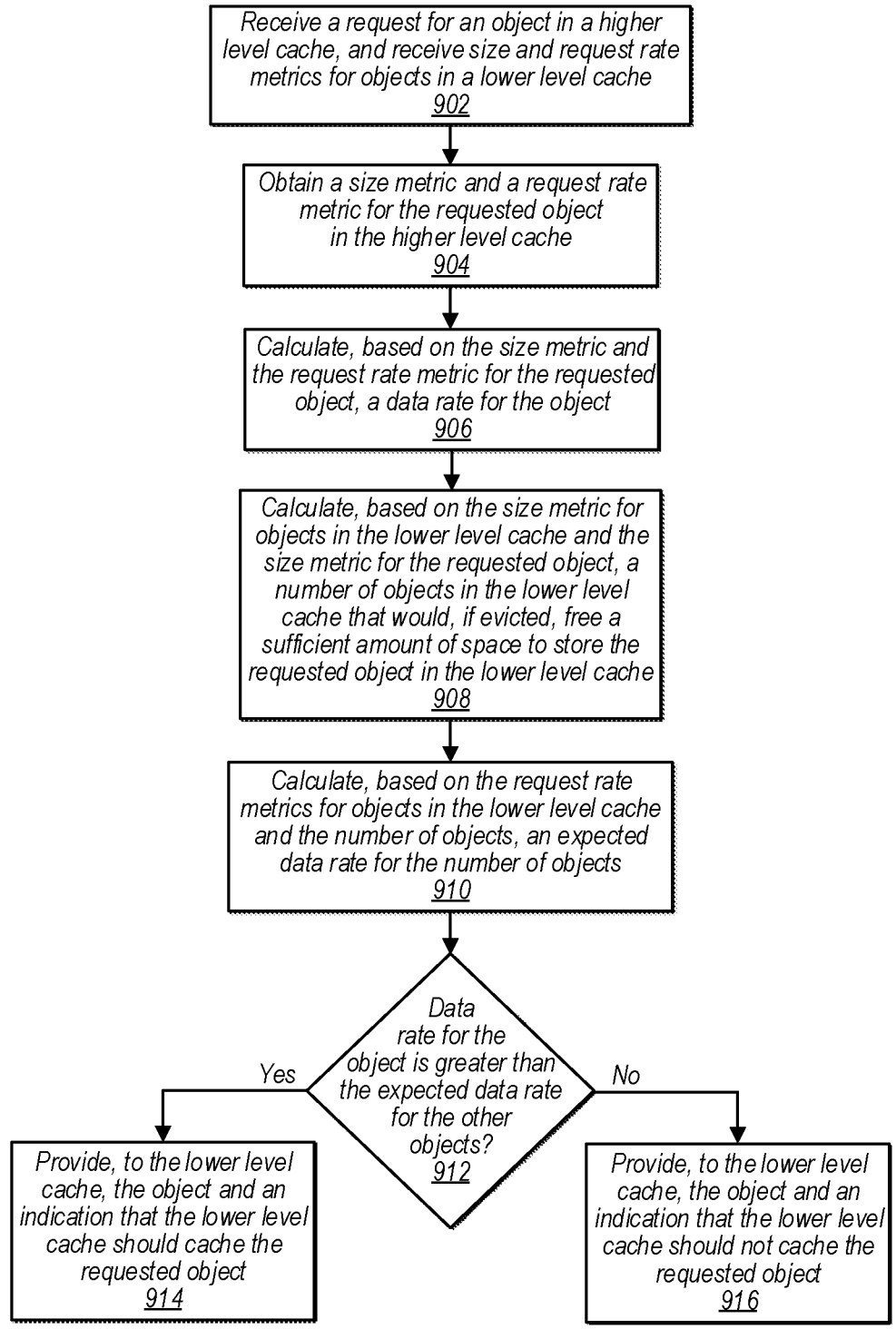
FIG. 9 is a high-level flowchart illustrating various methods and techniques to implement a system for providing, based on metrics for different cache levels, an indication of whether or not a lower level cache should cache a requested object, according to some embodiments.

FIG. 9 is a high-level flowchart illustrating various methods and techniques to implement a system for providing, based on metrics for different cache levels, an indication of whether or not a lower level cache should cache a requested object, according to some embodiments. As mentioned above, in various embodiments, any other suitable techniques may be used in order to determine and/or provide an indication of whether or not a lower level cache should cache a requested object.

At block 902, a higher level cache receives a request for an object in a higher level cache, and receives size and request rate metrics for objects in a lower level cache. At block 904, the higher level cache obtains a size metrics and a request rate metric for the requested object in the higher level cache.

At block 906, the higher level cache calculates, based on the size metric and the request rate metric for the requested object, a data rate for the object. At block 908, the higher level cache calculates, based on the size metric for objects in the lower level cache and the size metric for the requested object, a number of objects in the lower level cache that would, if evicted, free a sufficient amount of space to store the requested object in the lower level cache.

At block 910, the higher level cache calculates, based on the request rate metrics for objects in the lower level cache and the number of objects, an expected data rate for the number of objects. At block 912, the higher level cache determines whether the data rate for the object is greater than the expected data rate for the other objects (e.g., objects that would, if evicted, free sufficient space in the L1 cache to store the object). If the data rate for the object is greater, then at block 914, the higher level cache provides to the lower level cache an indication that the lower level cache should cache the requested object. If not, then at block 916, the higher level cache provides to the lower level cache an indication that the lower level cache should cache the requested object.

Figure 10:
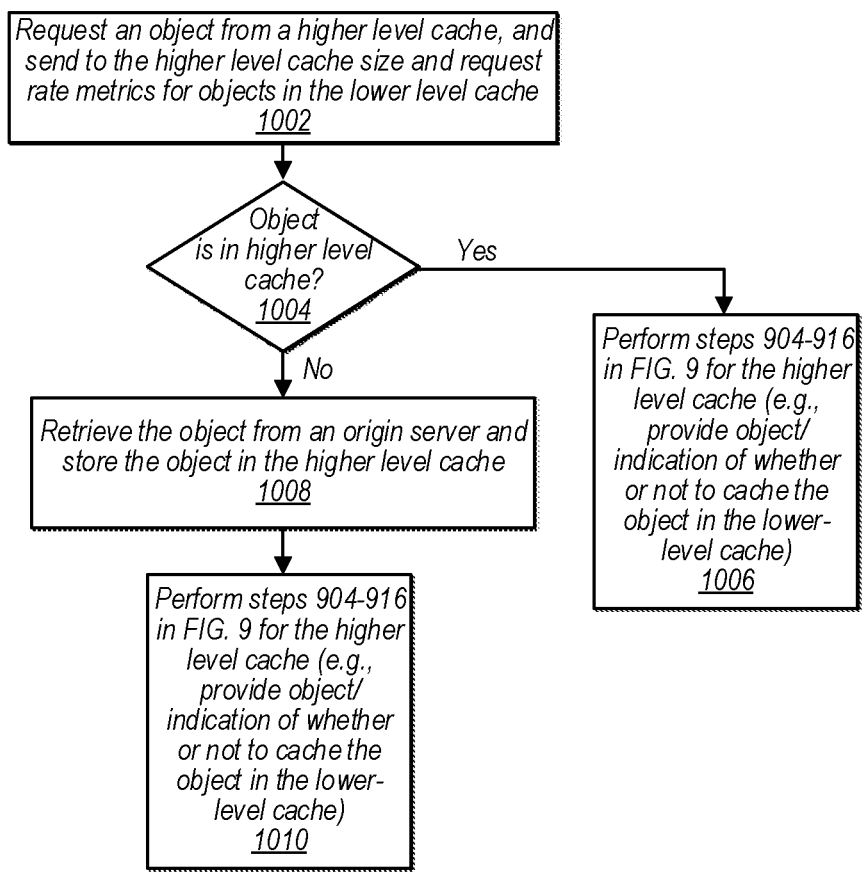
FIG. 10 is a high-level flowchart illustrating various methods and techniques to implement a system for intelligent hierarchical caching based on metrics for objects in multiple cache levels, according to some embodiments.

FIG. 10 is a high-level flowchart illustrating various methods and techniques to implement a system for intelligent hierarchical caching based on metrics for objects in multiple cache levels, according to some embodiments.

At block 1002, a lower level cache requests an object from a higher level cache, and sends to the higher level cache size and request rate metrics for objects in the lower level cache. At block 1004, the higher level cache determines whether the object is in the higher level cache. If so, then at block 1006, the higher level cache performs steps 904-916 in FIG. 9 for the higher level cache (e.g., provide object/indication of whether or not to cache the object in the lower-level cache).

Returning to block 1004, if the object is not in the higher level cache, then at block 1008, the higher level cache retrieves the object from an origin server and stores the object in the higher level cache. At block 1010, the higher level cache performs steps 904-916 in FIG. 9 for the higher level cache (e.g., provide object/indication of whether or not to cache the object in the lower-level cache).

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may implement the functionality described herein (e.g., the functionality of the caches, cache managers, and other components that implement the techniques described herein). The various methods as illustrated in the figures and described herein represent example embodiments of methods. The order of any method may be changed, and various elements may be added, reordered, combined, omitted, modified, etc.

Figure 11:
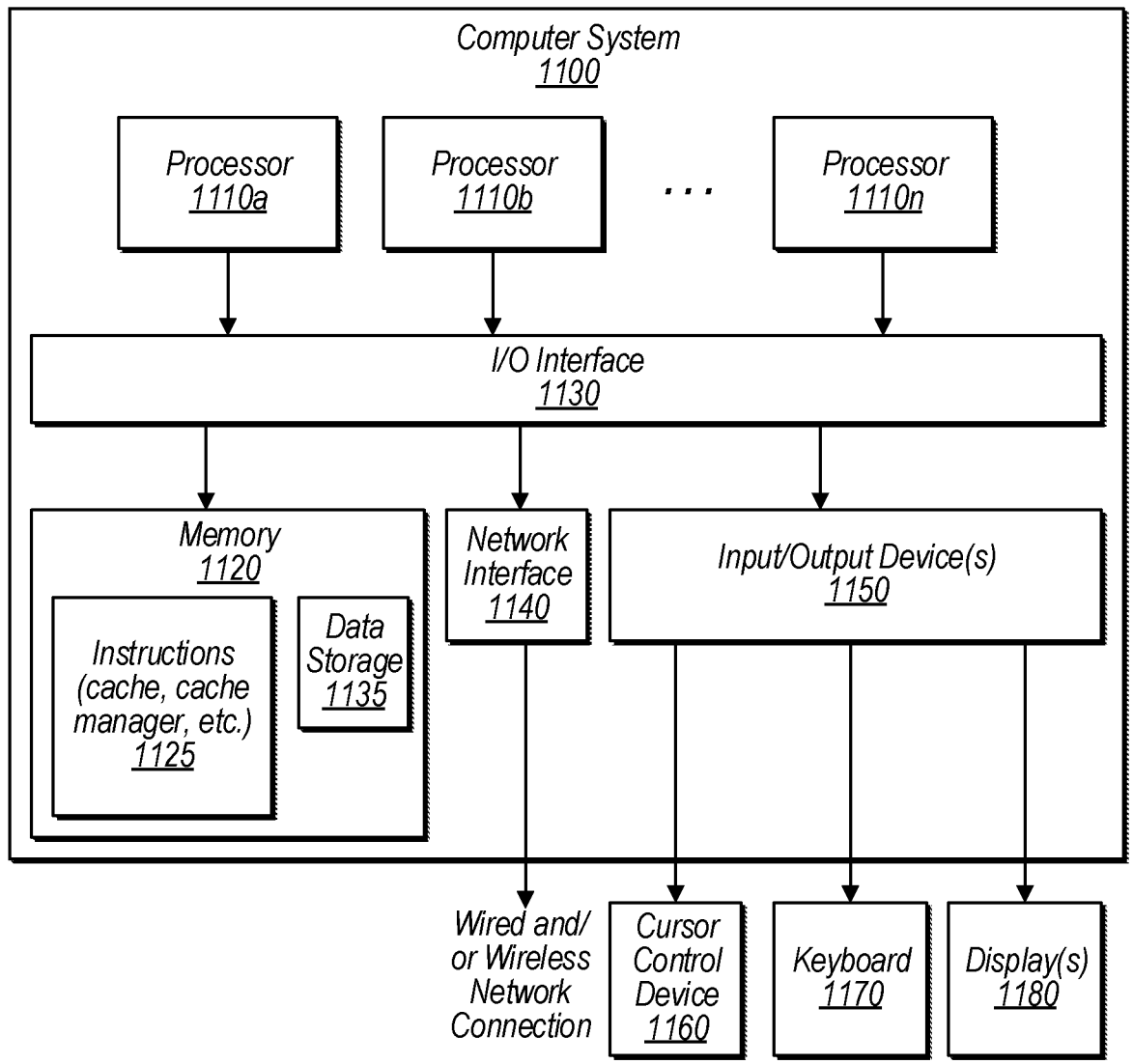
FIG. 11 is a block diagram illustrating an example computing system, according to some embodiments.

Embodiments to implement intelligent hierarchical caching based on metrics for objects in different cache levels as described herein may be executed on one or more computer systems, which may interact with various other systems or devices. One such computer system is illustrated by FIG. 11. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. Display(s) may include standard computer monitor(s) and/or other display systems, technologies or devices, in one embodiment. In some embodiments, it is contemplated that embodiments may be implemented using a single instance of computer system 1100, while in other embodiments multiple such systems, or multiple nodes making up computer system 1100, may host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions, in one embodiment. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

In some embodiments, at least one processor 1110 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1120 may store program instructions 1125 and/or data accessible by processor 1110, in one embodiment. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., cache, cache manager, etc.) are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. A computer-accessible medium may include non-transitory storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140, in one embodiment.

In one embodiment, I/O interface 1130 may be coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may allow data to be exchanged between computer system 1100 and other devices attached to a network, such as other computer systems, or between nodes of computer system 1100, in one embodiment. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100, in one embodiment. Multiple input/output devices 1150 may be present in computer system 1100 or may be distributed on various nodes of computer system 1100, in one embodiment. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1125, that implement the various embodiments of the systems as described herein, and data store 1135, comprising various data accessible by program instructions 1125, in one embodiment. In one embodiment, program instructions 1125 may include software elements of embodiments as described herein and as illustrated in the Figures. Data storage 1135 may include data that may be used in embodiments (e.g., cache objects, metrics, etc.). In other embodiments, other or different software elements and data may be included.

Those skilled in the art will appreciate that computer system 1100 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1100 may be transmitted to computer system 1100 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a lower level cache for a content delivery network; and
    a higher level cache for the content delivery network, wherein the higher level cache is at a higher level of a cache hierarchy for the content delivery network than the lower level cache;
    wherein the lower level cache is configured to:
        maintain aggregate size and request rate metrics for objects in the lower level cache;
        in response to receipt of a client request for an object, determine that the object does not exist in the lower level cache; and
        in response to the determination that the object does not exist in the lower level cache, request the object from the higher level cache and send to the higher level cache the aggregate size and request rate metrics for at least a portion of the objects in the lower level cache; and
    wherein the higher level cache is configured to:
        maintain size and request rate metrics for objects in the higher level cache;
        receive the request for the object;
        obtain, from the size and request rate metrics for objects in the higher level cache, a size metric and a request rate metric for the requested object;
        determine, based on the aggregate size and request rate metrics for at least the portion of the objects in the lower level cache and the size metric and the request rate metric for the requested object in the higher level cache, an indication of whether or not the lower level cache should cache the requested object; and
        send to the lower level cache:
            the requested object; and
            the indication of whether or not the lower level cache should cache the requested object.

2. The system of claim 1,
    wherein to determine an indication of whether or not the lower level cache should cache the requested object, the instructions, when executed by the one or more processors, cause the one or more processors to:
        calculate, based on the size metric and the request rate metric for the requested object, a data rate for the requested object;
        calculate, based on the size metric for the requested object and the aggregate size metric for at least the portion of the objects in the lower level cache, a number of the objects that would, if evicted, free a sufficient amount of space to store the requested object in the lower level cache;
        calculate, based on the request rate metric for at least the portion of the objects in the lower level cache and the number of objects, an expected data rate for the number of objects; and
        determine the indication of whether or not the lower level cache should cache the requested object based on whether the data rate for the requested object is greater than the expected data rate for the number of objects.

3. The system of claim 1, wherein the indication is an indication that the lower level cache should cache the requested object, and wherein the lower level cache is configured to:
in response to receipt of the requested object and the indication that the lower level cache should cache the requested object:
return the requested object to the client; and
determine, based at least on the indication that the lower level cache should cache the requested object, whether to cache the requested object in the lower level cache;
in response to a determination to cache the requested object in the lower level cache:
evict one or more of the objects in the lower level cache to free a sufficient amount of space to store the requested object; and
cache the requested object in the lower level cache.

4. The system of claim 1, wherein one or more regional servers of the content delivery network comprises the higher level cache and an edge location at a remote network comprises the lower level cache.

5. The system of claim 1, wherein the lower level cache is configured to:
receive, from the higher level cache, an indication that the object is not in the higher level cache;
in response to receipt of the indication that the object is not in the higher level cache, determine whether to request the object from another higher level cache, wherein the other higher level cache is at a higher level of a cache hierarchy for the content delivery network than the higher level cache; and
in response to a determination to request the object from the other higher level cache, request the object from the other higher level cache and send to the other higher level cache the aggregate size and request rate metrics for at least the portion of the objects in the lower level cache.

6. A method, comprising:
performing, by a cache system comprising one or more computing devices:
receiving a request for an object;
determining, based at least on a request rate metric for at least a portion of objects in a lower level cache and a request rate metric for the requested object in a higher level cache, an indication of whether or not the lower level cache should cache the requested object, wherein the higher level cache is at a higher level of a cache hierarchy than the lower level cache; and
providing, to the lower level cache, the requested object and the indication of whether or not the lower level cache should cache the requested object.

7. The method of claim 6, wherein determining an indication of whether or not the lower level cache should cache the requested object comprises:
calculating, based on a size metric for the requested object and a size metric for at least the portion of the objects in the lower level cache, a number of the objects that would, if evicted, free a sufficient amount of space to store the requested object in the lower level cache;
calculate, based on the request rate metric for at least the portion of the objects in the lower level cache and the number of objects, an expected data rate for the number of objects; and
determine the indication of whether or not the lower level cache should cache the requested object based on whether a data rate for the requested object is greater than the expected data rate for the number of objects.

8. The method of claim 7, further comprising:
in response to receiving the request for the object, calculating, based on the size metric for the requested object and the request rate metric for the requested object, the data rate for the requested object.

9. The method of claim 7, further comprising:
in response to receiving the request for the object, obtaining the size metric for the requested object and the request rate metric for the requested object in the higher level cache, wherein the request rate metric comprises the data rate for the requested object in the higher level cache.

10. The method of claim 7, wherein the size metric for at least the portion of the objects in the lower level cache comprises an average size of at least the portion of the objects in the lower level cache.

11. The method of claim 6, wherein the objects in the lower level cache comprises a plurality of objects, and wherein the cache metrics for at least a portion of the objects in the lower level cache comprises cache metrics for a subset of the objects in the lower level cache that is less than the plurality of objects, and wherein the subset of the objects is least recently used relative to other objects in the plurality of objects.

12. The method of claim 6, wherein one or more regional servers of a content delivery network comprise the higher level cache and an edge location at a remote network comprises the lower level cache.

13. The method of claim 6, wherein an edge location comprises the higher level cache and the lower level cache, and wherein the higher level cache is based on content stored at a remote data center of the content delivery network.

14. The method of claim 6, further comprising:
in response to receiving, at the lower level cache, the requested object and the indication that the lower level cache should cache the requested object:
returning the requested object to a client; and
determining, based at least on the indication that the lower level cache should cache the requested object, to cache the requested object in the lower level cache; and
in response to determining to cache the requested object in the lower level cache:
evicting one or more of the objects in the lower level cache to free a sufficient amount of space to store the requested object; and
caching the requested object in the lower level cache.

15. One or more non-transitory computer-accessible storage media storing program instructions that when executed on or across one or more processors cause the one or more processors to:
receive a request for an object;
determine, based on a request rate metric for at least a portion of objects in a lower level cache and a request rate metric for the requested object in a higher level cache, an indication of whether or not the lower level cache should cache the requested object, wherein the higher level cache is at a higher level of a cache hierarchy than the lower level cache; and
provide, to the lower level cache, the requested object and the indication of whether or not the lower level cache should cache the requested object.

16. The one or more storage media as recited in claim 15, wherein to determine an indication of whether or not the lower level cache should cache the requested object, the program instructions when executed on or across the one or more processors cause the one or more processors to:
- calculate, based on a size metric for the requested object and a size metric for at least the portion of the objects in the lower level cache, a number of the objects that would, if evicted, free a sufficient amount of space to store the requested object in the lower level cache;
- calculate, based on the request rate metric for at least the portion of the objects in the lower level cache and the number of objects, an expected data rate for the number of objects; and
- determine the indication of whether or not the lower level cache should cache the requested object based on whether a data rate for the requested object is greater than the expected data rate for the number of objects, wherein the data rate is based at least on the request rate metric for the requested object.

17. The one or more storage media as recited in claim 15, further comprising program instructions that when executed on or across the one or more processors further cause the one or more processors to:
- in response to receipt of the request for the object, obtain the cache metrics for the requested object from a data store, wherein the data store comprises cache metrics for a plurality of objects in the higher level cache.

18. The one or more storage media as recited in claim 16, wherein the size metric for at least the portion of the objects in the lower level cache comprises an average size of at least the portion of the objects in the lower level cache.

19. The one or more storage media as recited in claim 15, wherein the objects in the lower level cache comprises a plurality of objects, and wherein the cache metrics for at least a portion of the objects in the lower level cache comprises metrics for a subset of the objects in the lower level cache that is less than the plurality of objects, and wherein the subset of the objects is least recently used relative to other objects in the plurality of objects.

20. The one or more storage media as recited in claim 15, further comprising program instructions that when executed on or across the one or more processors further cause the one or more processors to:
- in response to receipt of the requested object and the indication that the lower level cache should cache the requested object:
  - return the requested object to a client; and
  - determine, based at least on the indication that the lower level cache should cache the requested object, whether to cache the requested object in the lower level cache;
- in response to a determination to cache the requested object in the lower level cache:
  - evict one or more of the objects in the lower level cache to free a sufficient amount of space to store the requested object;
  - cache the requested object in the lower level cache; and
  - update the cache metrics for the lower level cache based on the requested object.

\* \* \* \* \*